H. A. BLEY.
SEED PLANTER.
APPLICATION FILED MAR. 30, 1916.

1,202,658.

Patented Oct. 24, 1916.

Witnesses

Inventor
H. A. Bley
By
Attorney

UNITED STATES PATENT OFFICE.

HENRY A. BLEY, OF EDEN, NEW YORK.

SEED-PLANTER.

1,202,658.  Specification of Letters Patent.  Patented Oct. 24, 1916.

Application filed March 30, 1916. Serial No. 87,824.

*To all whom it may concern:*

Be it known that I, HENRY A. BLEY, a citizen of the United States, residing at Eden, in the county of Erie, State of New York, have invented certain new and useful Improvements in Seed-Planters; and I do hereby declare the following to be a full, clear, and exact description of the invention, such as will enable others skilled in the art to which it appertains to make and use the same.

This invention relates to a seed planter.

An object of the invention resides in the provision of a device by means of which seeds will be dropped into a furrow so that they will be spaced equal distances apart.

A further object of the invention resides in the provision of a device by means of which the furrow will be opened, seeds dropped into the furrow and the furrow closed.

With these and other objects in view, such as will appear as my description progresses, my invention comprises the combination and arrangement of parts as set forth in and falling within the scope of the appended claims.

Figure 1:
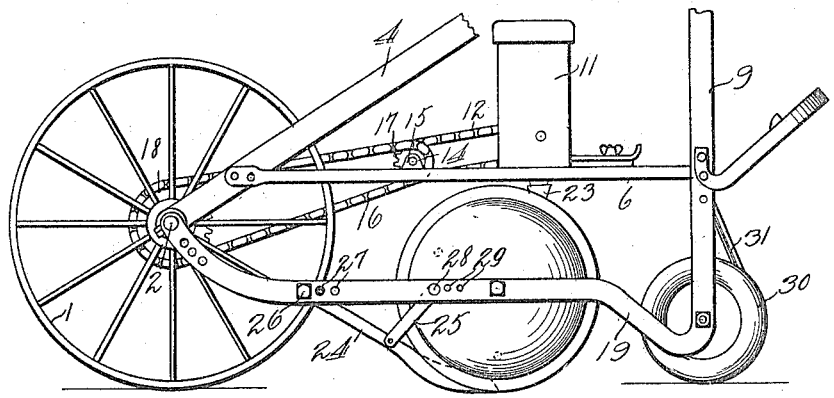
Figure 2:
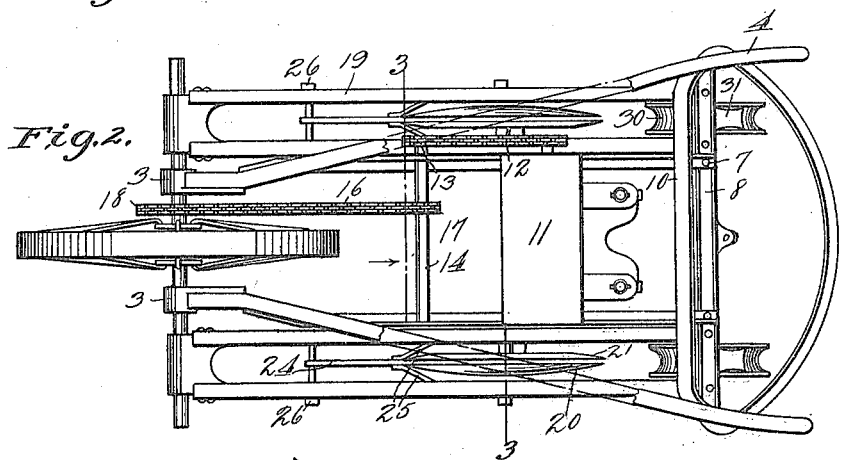
Figure 3:
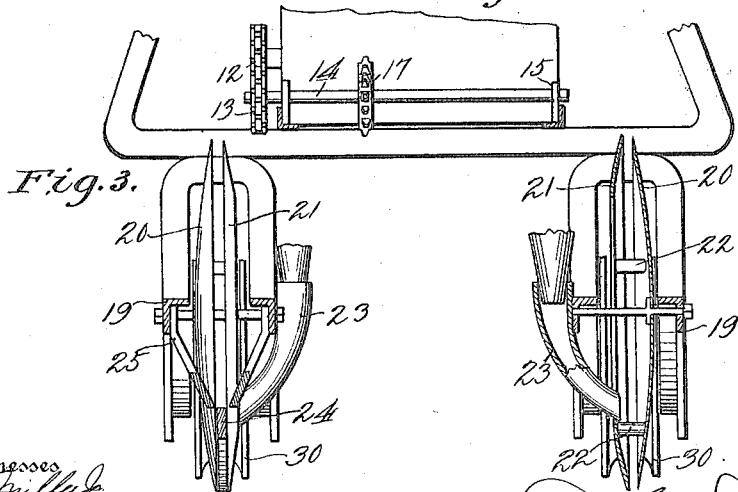

In the drawing: Figure 1 is a side elevation of a planter including my invention; Fig. 2 is a plan view thereof, and Fig. 3 is a sectional view on line 3—3 of Fig. 2.

In the drawing, I have illustrated a planter which includes a forward supporting wheel 1 mounted on an axle 2. Secured to the axle on each side of the wheel is a casting 3 to which a handle 4 is attached. This handle extends upwardly as illustrated in the drawing. Secured to the handles, at 5, and extending rearwardly from the point of securement are bars 6 which are, at their rear ends, secured, at 7 to a cross bar 8, which together with the bars 6 form a frame. Side bars 9 which are integral with the bar 8 extend upwardly and are joined at their upper ends by an integral bar 10. The handles 4 are secured to these upwardly extending bars 9.

A seed hopper 11 is mounted on the bars 6 and the seed dropping mechanism therein, which is not disclosed in the drawing as it is of any desirable form, is driven by means of a chain 12 which passes over a sprocket 13 on a shaft 14. This shaft 14 is mounted in suitable bearings 15 on the side bars 6 and is driven by means of a chain 16 which passes over a sprocket 17 thereon and a sprocket 18 on the axle 2, which latter sprocket is secured to the wheel 1 and rotates therewith.

Secured to the axle 2 adjacent to each end thereof and extending downwardly and rearwardly therefrom is a pair of spaced bars 19 which are, at their rear ends, secured to the rear bar 8 of the frame. Rotatably mounted between the members of each pair of bars 19 is a concavo-convex disk 20 and secured to each of these disks is a ring 21, the edges of which ring and disk are spaced apart and held in such position by blocks 22 which are disposed between the same.

In order that the seeds may be conveyed from the hopper 11 to the spaces between the disks and rings, I have provided raceways 23 which extend from the hoppers into said spaces. Thus when the planter is in operation, the seeds will be dropped through the race-ways between the disks and rings and will thence pass through the spaces between the edges of the disks and rings to the ground.

In order that the furrow may be formed and that the space between the disks and rings may be kept free from dirt so that the seeds will drop freely therethrough, I have provided a pair of knives 24, one knife being mounted between the members of each pair of bars 19 and being braced by suitable braces 25 which are secured to the members. These knives are mounted on bolts 26 which are adapted to be secured in any of a plurality of holes 27 and the braces 25 are secured by bolts 28 which are adapted to be secured in any of a plurality of holes 29. These knives 24 extend rearwardly from their points of securement between the disks 20 and the rings 21 at the lower portions thereof so that, during the advance of the planter, the furrow will be formed and the space between the disks and rings will be kept free from dirt. This will allow the seeds to drop directly to the ground as there will be no dirt between the disks and rings to interfere with their free passage. After the seeds have been dropped the furrows will be closed by suitable rollers 30 which are provided with scrapers 31 and which are mounted directly in the rear of the disks and rings.

It will be seen that I have provided a device wherein the seeds will be fed directly to the furrow and will be prevented from dropping to the sides thereof. I have further provided knives which extend between the disks and rings and open the furrow and furthermore prevent the accumulation of dirt between the rings and disks so that the seeds may pass freely from the race-ways to the furrows.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:

1. In a seed planter, the combination with a spaced disk and ring, of means for feeding seeds to the space between the same, means for forming a furrow in advance of the ring and disk and for preventing the accumulation between the ring and disk, and means for closing the furrow.

2. In a seed planter, the combination with a disk, of a ring secured thereto and having its edge in spaced relation to the edge of the disk, means for feeding seeds through the ring to the space between it and the disk and means for preventing the accumulation of dirt between the ring and disk.

3. In a seed planter, the combination with a concavo-convex disk, of a concavo-convex ring secured thereto in spaced relation, means for feeding seed to the space between the disk and ring and means for forming a furrow and for preventing the accumulation of dirt between the disk and ring.

4. In a seed planter, the combination with a pair of spaced bars, of a wheel for supporting the same, a disk rotatably mounted between the bars, a ring secured to the disk in spaced relation, means for feeding seeds to the space between the disk and ring and a knife secured between the bars and extending rearwardly and downwardly between the ring and disk.

In testimony whereof, I affix my signature, in the presence of two witnesses.

HENRY A. BLEY.

Witnesses:
W. McKINLAY,
D. E. MORRIS.

Copies of this patent may be obtained for five cents each, by addressing the "Commissioner of Patents, Washington, D. C."